United States Patent
Roberts et al.

(10) Patent No.: US 8,311,049 B2
(45) Date of Patent: Nov. 13, 2012

(54) METHOD AND DEVICE FOR SCHEDULING PACKETS FOR ROUTING IN A NETWORK WITH IMPLICIT DETERMINATION OF PACKETS TO BE TREATED AS PRIORITY

(75) Inventors: James Roberts, Le Bretonneux (FR); Sara Oueslati, Chatillon (FR); Abdesselem Kortebi, Perros Guirec (FR)

(73) Assignee: France Telecom, Paris (FR)

( * ) Notice: Subject to any disclaimer, the term of this patent is extended or adjusted under 35 U.S.C. 154(b) by 460 days.

(21) Appl. No.: 11/667,893

(22) PCT Filed: Nov. 15, 2005

(86) PCT No.: PCT/FR2005/050949
§ 371 (c)(1),
(2), (4) Date: May 15, 2007

(87) PCT Pub. No.: WO2006/051244
PCT Pub. Date: May 18, 2006

(65) Prior Publication Data
US 2007/0291644 A1    Dec. 20, 2007

(30) Foreign Application Priority Data

Nov. 15, 2004 (FR) .................................... 04 12063

(51) Int. Cl.
*H04L 12/28* (2006.01)
(52) U.S. Cl. ...................................................... 370/412
(58) Field of Classification Search ............... 370/230.1, 370/232, 412, 413, 415, 417
See application file for complete search history.

(56) References Cited

U.S. PATENT DOCUMENTS

| 5,812,526 | A | * | 9/1998 | Chang et al. ................. 370/230 |
| 6,810,426 | B2 | * | 10/2004 | Mysore et al. ............... 709/234 |
| 7,126,918 | B2 | * | 10/2006 | Roberts ........................ 370/235 |
| 2001/0007570 | A1 | * | 7/2001 | Mangin ........................ 370/537 |
| 2003/0112817 | A1 | * | 6/2003 | Woo et al. .................... 370/413 |
| 2005/0111462 | A1 | * | 5/2005 | Walton et al. ............. 370/395.4 |
| 2007/0091852 | A1 | * | 4/2007 | Malladi et al. ............... 370/332 |

OTHER PUBLICATIONS

Shih-Chiang Tsao et al., "Pre-order Deficit Round Robim: a new scheduling algorithm for packet-switched networks." Computer Networks, Elsevier Science Publishers B.V., Col. 35, No. 2-3, pp. 287-305, Feb. 2001.*

(Continued)

*Primary Examiner* — Anh-Vu Ly
*Assistant Examiner* — Peter Cheng
(74) *Attorney, Agent, or Firm* — Cozen O'Connor

(57) ABSTRACT

A method of ordonnancing packets belonging to different flows comprises: a step (E58) of queuing each packet in a queue associated with the flow of said packet; and for each of said queues processed cyclically, a step of sending packets contained in said queue up to a quota for said cycle; said method being characterized in that it further includes: a step (E40, E54) of determining the priority of said packet before said step (E58, E56, E48) of queuing, the priority packets being, firstly, the first packets of the inactive flows, namely the flows for which no packet has been received in said cycle, and, secondly, the packets of the active flows for which the volume of packets received in the cycle is less than the quota; and a step of sending with priority in said cycle packets determined to have priority during said determination step (E40, E54).

11 Claims, 6 Drawing Sheets

OTHER PUBLICATIONS

S-C. Tsao et al., "Pre-order Deficit Round Robin: a new scheduling algorithm for packet-switched networks", Computer Networks, Elsevier Science Publishers B.V., vol. 35, No. 2-3, pp. 287-305, Feb. 2001.

S. Kanhere et al., "Fair, efficient and low-latency packet scheduling using nested deficit round robin", High Performance Switching and Routing, 2001 IEEE Workshop, pp. 6-10, May 29, 2001.

M. H. MacGregor et al., "Deficits for bursty latency-critical flows: DRR++", Networks, 2000, Proceedings IEEE International Conference, pp. 287-293, Sep. 5, 2005.

S. Ben Fredj et al., "Measurement-based Admission Control for Elastic Traffic", ITC17, Dec. 2001.

M. Shreedhar et al., "Efficient Fair Queuing using Deficit Round-Robin", IEEE/ACM Transactions on Networking, vol. 4, No. 3, pp. 375-385, Jun. 1, 1996.

* cited by examiner

US 8,311,049 B2

METHOD AND DEVICE FOR SCHEDULING PACKETS FOR ROUTING IN A NETWORK WITH IMPLICIT DETERMINATION OF PACKETS TO BE TREATED AS PRIORITY

RELATED APPLICATIONS

This is a U.S. National Stage of International Application No. PCT/FR2005/050949, filed on Nov. 15, 2005.

BACKGROUND OF THE INVENTION

The field of the invention is the architecture of telecommunication networks.

The invention is more particularly aimed at an ordonnancing method, an ordonnancing device, and a multiservice data packet router, all of low complexity, aiming to improve the quality of service by means of which multiservice data packets included in various flows of that network are routed.

It applies in particular to an Internet network.

The "flow" concept used in this document is for example that of the "flow-aware" architecture disclosed in the paper by Bonald et al. "IP traffic and QoS control: the need for a flow-aware architecture", World Telecom Conference, Paris, 2002.

The Internet has a multiservice vocation and is called upon to support a wide range of services and applications. Two major classes of traffic are distinguished on the Internet, namely real-time traffic (also known as flowing traffic), generally produced by audio or video applications, and data traffic (also known as elastic traffic) corresponding to the transfer of digital documents. The real-time traffic has quality of service requirements corresponding to the requirement for conservation of the signal—the variations of bit rate that characterize the signal produced by the source must be preserved as the signal crosses the network. The quality of service of the data traffic is measured by the document transfer time. That time, or the corresponding average bit rate achieved during the transfer, depends on the whole of the communication chain from the source to the destination. A quality of service objective for an Internet network could be to appear transparent to data traffic without introducing any additional bit rate reduction over limitations introduced elsewhere (server, access networks, user equipment); in this sense the network conserves the bit rate of the data flows.

The Internet public network offers a transport service to user clients in a commercial context. The question of charging is therefore important. The network architecture must provide a return on investment for the operator combined with competitive pricing of the high-quality services demanded by users.

A prior art ordonnancing method that is of low complexity (of order O(1), i.e. independent of the number of flows) known as DRR (standing for "deficit round robin") is described by M. SHREEDHAR and G. VARGHESE: "Efficient fair queuing using deficit round robin", IEEE/ACM Transactions on Networking, Volume 4, Issue 3, June 1996, pages 375-385.

The DRR ordonnancing method is based on processing the flows in a cyclic manner, in accordance with the "round robin" principle. This method associates a queue with each flow, each queue, processed cyclically, being authorized to send, in each cycle, packets up to a quota (a quantity of data, for example measured in bytes).

This DRR method ensures a reasonable degree of equity by maintaining a deficit counter for compensating any differences in the packet sizes of the various flows.

Variants of the DRR method associate priority processing with the packets of certain flows.

In particular, the DRR+ method described in the above-mentioned paper enables priority processing of flows sensitive to delay, to the detriment of "best effort" flows. In that method, the priority flows must comply with a contract, i.e. they must not send more than a certain volume of data during a predetermined time period.

Document FR2854296, in the name of the applicant, proposes an ordonnancing method with implicit differentiation of packets to be processed with priority, and consequently offering the advantage of dispensing with that type of contract. However, the ordonnancing method described in that document, which is of the "self-clock fair queuing" type, is of O(log n) order, n being the number of flows to be taken into account, which might seem to be a limitation on its implementation in certain types of routers.

The invention aims to solve the above problems.

OBJECT AND SUMMARY OF THE INVENTION

To this end, a first aspect of the invention provides a method of ordonnancing packets belonging to different flows, the method comprising:
  a step of queuing each packet in a queue associated with the flow of that packet;
  for each of the queues processed cyclically, a step of sending packets contained in that queue up to a quota for that cycle;
    a step of determining the priority of the packet before the aforementioned queuing step, the priority packets being:
      firstly, the first packets of the inactive flows, namely the flows for which no packet has been received in the cycle; and
      secondly, the packets of the active flows for which the volume of packets received in the cycle is less than the quota; and
  a step of sending with priority in the cycle packets determined to have priority during that determination step.

The invention also provides a device for ordonnancing packets belonging to different flows, the device comprising:
  means for queuing each packet in a queue associated with the flow of that packet;
  means for processing each of the queues cyclically, these processing means including means for sending packets contained in a queue up to a quota for that cycle;
  means for determining the priority of a packet before the aforementioned queuing of that packet, the priority packets being:
    firstly, the first packets of the inactive flows, namely the flows for which no packet has been received in the cycle; and
    secondly, the packets of the active flows for which the volume of packets received in the cycle is less than that quota; and
  means for sending with priority in the cycle packets determined to have priority by those determination means.

Thus ordonnancing in accordance with the invention is distinguished from the prior art in that it makes a distinction between the priority of the flows as a function of their intrinsic bit rate characteristics and not as a function of a contract or an externally assigned priority associated with the packets or flows, and with a level of complexity that is independent of the number of flows.

The ordonnancing device and method put the packets in a queue in accordance with an equitable sharing with priority algorithm. "Equitable sharing with priority" ordonnancing gives priority to packets of flows whose bit rate is below a dynamic threshold that corresponds to the bit rate that would be generated by a flow that always had packets to send.

This ordonnancing process and device advantageously use the DRR ordonnancing method referred to above.

One particular implementation of the ordonnancing method according to the invention further includes a step of measuring congestion counters adapted to be processed to calculate congestion estimators used for admission control.

These congestion estimators may in particular be used to control admission to the core network.

In one particular implementation, these congestion estimators (or parameters) consist in:
 a fair bit rate value, which is a measure of the bit rate that a data flow would produce if it always had packets to send; and
 a priority load value, corresponding to the volume of said priority packets transmitted during a period divided by the duration of that period.

In one particular implementation, ordonnancing in accordance with the invention is associated with "fair queuing" type admission control in respect of each flow.

Thus a second aspect of the invention consists in a packet router including the above ordonnancing device and a module for controlling admission of the packets as a function of congestion parameters measured by the ordonnancing device.

In one particular embodiment, the admission control module is further adapted to route directly the packets belonging to protected flows, namely flows for which at least one packet has been received by said admission module in a predetermined term interval.

This kind of device or method can function without admission control means in the particular context of an access network where the risk of congestion can be controlled more easily than in the core network.

In one particular implementation, the steps of the ordonnancing method are executed by a computer under the control of instructions of a computer program. Consequently, the invention also consists in a computer program stored on an information medium, that program including instructions enabling the above ordonnancing method to be executed when that program is loaded into and executed by an electronic data processing system.

The invention also relates to an information medium readable by an electronic data processing system and optionally totally or partially removable, in particular a CD-ROM or a magnetic medium, such as a hard disk or a diskette, or a transmissible medium, such as an electrical or optical signal, including instructions of a computer program for executing the above ordonnancing method when that program is loaded into and executed by an electronic data processing system.

Since the particular advantages of the ordonnancing device, the router, the information medium and the computer program are identical to those of the above ordonnancing method, they are not repeated here.

BRIEF DESCRIPTION OF THE DRAWINGS

Other aspects and advantages of the present invention become more clearly apparent on reading the following description of particular embodiments, the description being given by way of non-limiting example only and with reference to the appended drawings, in which.

DETAILED DESCRIPTION OF AN IMPLEMENTATION

Figure 1:
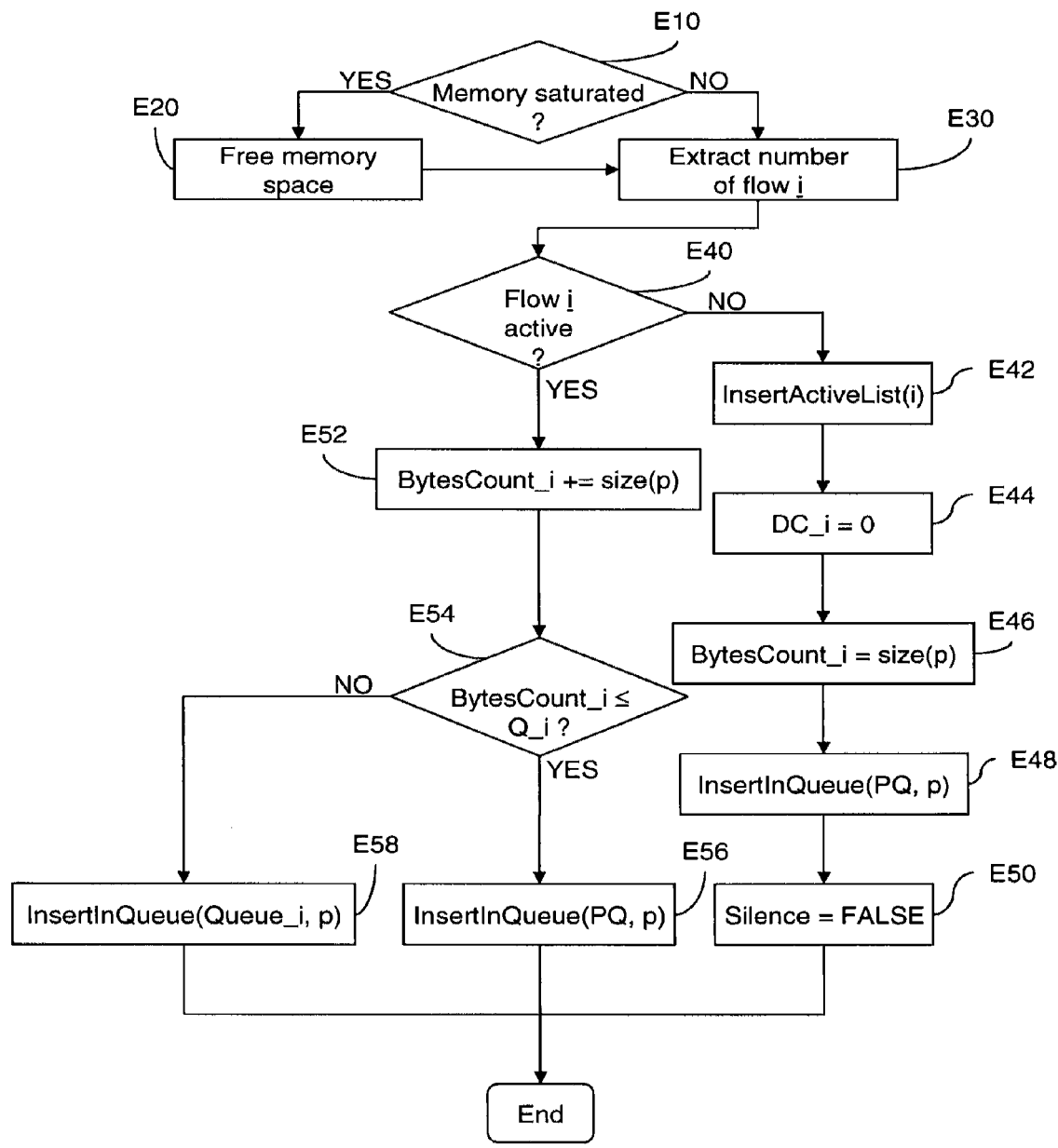
FIG. 1 is a flowchart showing the principal steps of an enqueuing operator used in an ordonnancing method in accordance with one particular implementation of the invention.

One particular implementation of an ordonnancing method in accordance with the invention is described below. In the example described here, that ordonnancing method is implemented by a computer program PROG_ORD.

In accordance with the invention, this ordonnancing method is a DRR type method modified to enable priority processing of packets of flows whose bit rates do not exceed the fair bit rate.

In the particular implementation described here, this ordonnancing method is also used to perform congestion measurements needed by an admission control module described below with reference to FIG. 4.

It is assumed below that the ordonnancing method processes packets p belonging to flows i.

In the particular implementation described here, the ordonnancing method of the invention uses different queues Queue_i to store the packets p of each of the active flows i.

Note that the ordonnancing method of the invention allows a different quota $Q\_i$ for each flow i, although the envisaged application of implicit differentiation in quality of service assumes that the quotas $Q\_i$ are identical and equal to the maximum packet size MTU (maximum transfer unit).

Be this as it may, the quota $Q\_i$ is greater than or equal to the maximum packet size MTU.

In the detailed example described here, these queues are numbered from 1 to n, where n is the maximum number of active flows.

The ordonnancing method described here also uses an additional queue reserved for a dummy flow for measuring the fair bit rate, meaning the bit rate that would be produced by a data flow that always has packets to send.

The ordonnancing method in accordance with the invention also uses a priority queue PQ to service packets that are determined to have priority as a function of the intrinsic characteristics of the bit rate of the flows to which they belong.

In the remainder of the description a distinction is made between the "real" queues (PQ, Queue_1, . . . , Queue_n) and the "dummy" queue for measuring the fair bit rate.

The real queues are all queues of the FIFO (first in first out) type known to the person skilled in the art.

The ordonnancing method of the invention described here also uses a list ActiveList of active flows and two operators InsertActiveList( ) and RemoveActiveList( ) respectively adapted to add a flow index at the end of the list ActiveList of active flows and to remove a flow index from that list.

This ordonnancing method also uses a function FreeBuffer ( ) adapted to free memory space by rejecting the packet situated at the head of the longest queue Queue_i using the method described in "Stochastic Fairness Queuing", P. McKenney, Internetworking: Research and Experience, Vol. 2, January 1991, pp. 113-131.

Other memory-freeing strategies that seek to preserve equity between the flows may also be used.

As in most prior art ordonnancing methods, the ordonnancing method of the invention described here primarily uses two standard queue manipulation operators:
- an operator InsertInQueue( ) for inserting a packet at the end of a queue;
- an operator RemoveFromQueue( ) for retrieving the element from the head of the queue.

During a preliminary initialization step, the ordonnancing program PROG_ORD initializes the deficit counters DC_i to 0 for all the queues Queue_i and inserts the index 0 corresponding to the dummy flow for measuring the fair bit rate into the list ActiveList of active flows.

The main steps of the Enqueue( ) operator are described below with reference to FIG. 1.

On reception of a packet p, the operator Enqueue( ) executes a first step E10 during which it tests whether or not the buffer memory area ("buffer zone") in which the packets of all the active flows are stored is saturated.

If the buffer memory is saturated, the result of the test E10 is positive.

The test is then followed by a step E20 during which memory space is freed by rejecting the packet situated at the head of the longest queue Queue_i by calling the above-mentioned function FreeBuffer( ).

The memory freeing step E20 is followed by a step E30 during which the number i of the flow to which the packet p belongs is obtained.

In contrast, if the buffer memory is not saturated, the result of the test E10 described above is negative. The test is then followed by the above step E30.

The step E30 of obtaining the flow index is followed by a test E40 which verifies whether the flow i of the packet p is active, which amounts to verifying whether the flow i is in the list ActiveList of active flows.

If not, the result of the test E40 is negative. The test is then followed by a step E42 during which the flow is inserted in the list ActiveList of active flows by calling the above-mentioned function InsertActiveList( ).

This insertion step E42 is followed by a step E44 during which a deficit counter DC_i of the queue Queue_i associated with the active flow i is initialized to 0.

This deficit counter DCi is similar to that of the DRR ordonnancing method known to the person skilled in the art.

In accordance with the invention, in each cycle, each newly-received flow can send priority data up to its quota Q_i.

To this end, the initialization step E44 is followed by a step E46 during which the size size(p) of the packet p is stored in a variable BytesCount_i that stores the number of bytes of the packets of the flow i to be processed with priority.

This assignment step E46 is followed by a step E48 during which the packet p is added to the end of the priority queue PQ using the function InsertInQueue( ) for inserting a packet at the end of a queue.

This step E48 of insertion in a queue is followed by a step E50 during which a variable Silence is initialized with a Boolean value FALSE in order to store the fact that at least one packet p is ready to be sent.

As described later, this flag Silence is used to measure the fair bit rate in the absence of traffic, the absence of traffic being indicated by the fact that the identifier is equal to the Boolean value TRUE.

This step E50 terminates the process of queuing the packet p in this embodiment.

If the packet p being processed is a packet of an active flow i, the result of the above test E40 is positive.

The test is then followed by a step E52 during which the size of the packet p is added to the content of the above variable BytesCount_i, which is used to store the number of bytes of the packets of the flow i to be processed with priority.

This accumulation step is followed by a test E54 which verifies whether the number of bytes of the flow i to be processed with priority (i.e. BytesCount_i) is less than or equal to the quota Q_i of the queue Queue_i reserved for that flow.

If so, the result of the test E54 is positive. The test is then followed by a queuing step E56 similar to the above queuing step E48, during which the packet p is added at the end of the priority queue PQ.

Otherwise, if the number BytesCount_i of bytes to be processed with priority for the flow i exceeds the quote Q_i for that cycle, the result of the test E54 is negative. The test is then followed by a step E58 of queuing the packet p in the normal (i.e. non-priority) queue Queue_i reserved for that flow i.

The queuing steps E56 and E58 terminate the queuing process of this particular embodiment.

Figure 2:
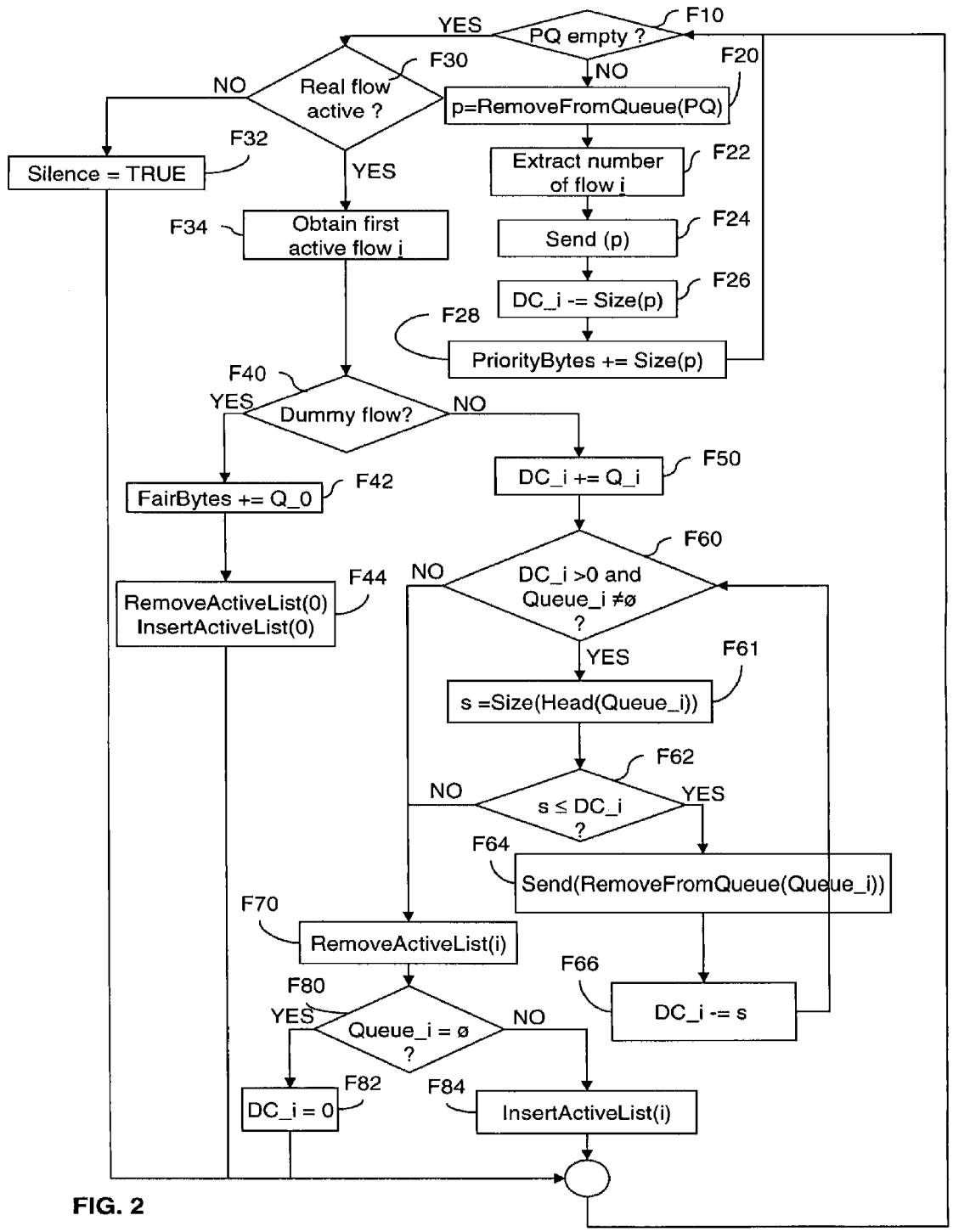
FIG. 2 is a flowchart showing the principal steps of a dequeuing operator used in an ordonnancing method in accordance with one particular implementation of the invention.

The principal steps of the extraction from a queue operation Dequeue( ) are described next with reference to FIG. 2.

This operator Dequeue( ) for terminating the processing of a packet is used:
- at the end of each operation of sending a packet p; and
- following the arrival of a packet when the system is empty, this second condition being satisfied if each queue Queue_i for i varying from 1 to n is empty and the queue PQ is empty.

In the implementation described here, this operator Dequeue( ) takes the form of an endless loop consisting of the steps F10 to F84 described below.

A first step F10 verifies whether the priority queue PQ is empty. If not, the test F10 is followed by a step F20 during which the packet p at the head of the list is extracted from the priority queue PQ.

This operation is effected using the function RemoveFromQueue( ) adapted to retrieve an element at the head of a queue.

This extraction step F20 is followed by a step F22 similar to the step E30 already described with reference to FIG. 1 of obtaining the flow number i of this packet p.

This step F22 of obtaining the number is followed by a step F24 during which the packet p is sent.

This sending step F24 is followed by a step F26 during which the size (p) of this packet p is subtracted from the deficit counter DC_i_ of the Queue_i associated with the flow i of the packet p removed from the priority queue PQ in the step F20.

This subtraction step F26 is followed by a step F28 during which the size of the packet p is added to the content of a variable PB that is used to store the volume of the traffic to be processed with priority.

This accumulation step F28 is followed by the test F10 already described, which verifies whether the priority queue PQ is empty. Thus the steps F10 to F28 constitute a loop that continues for as long as there are packets in the priority queue PQ.

During this loop, the deficit counters DC_i associated with the flows i whose packets have been sent with priority are decremented to prevent each flow from exceeding its quota Q_i in the current cycle.

If the priority queue PQ is empty, the result of the test F10 is positive. The test is then followed by a test F30 which verifies whether at least one real flow is active.

In the embodiment described here, this amounts to verifying that the list ActiveList of active flows contains more than one element, since this list always contains at least the dummy flow 0 used for measuring the fair bit rate.

If not, the result of the test F30 is negative. The test is then followed by a test F32 during which the variable Silence, described above in relation to step E50 from FIG. 1, is assigned the Boolean constant TRUE, in order to represent the fact that there are no longer any packets to be sent either in the priority queue PQ or in any of the non-priority queues Queue_i.

This assignment step F32 is followed by the above-described step F10, which tests whether the priority queue PQ is empty.

If at least one real flow is active, the result of the test F30 is positive. The test is then followed by a step F34 which obtains the identifier of the flow i at the head of the list ActiveList of active flows.

This step F34 of obtaining the identifier is followed by a set of steps F40 to F44 for measuring the volume of bytes FB that the dummy flow 0 could have sent, this volume FB being used to estimate the fair bit rate, as described later.

More precisely, the step F40 tests whether the flow obtained at the head of the list ActiveList of active flows in the preceding step F34 is the dummy flow 0.

If so, the result of the test F40 is positive. The test is then followed by a step F42 during which the quota Q_0 assigned to the dummy flow 0 is added to the volume FB.

This accumulation step F42 is followed by a step F44 during which the dummy queue 0 is removed from the head of the cycle and immediately added to the end of the cycle using the above-mentioned standard operations InsertActiveList( ) and RemoveActiveList( ).

If the active flow i obtained on testing the list ActiveList of active flows during the step F34 is a real flow, the result of the test F40 is negative.

The test is then followed by a step F50 during which its quota Q_i is added to the current value of the deficit counter DC_i for the flow i.

This accumulation step F50 is followed by a series of steps F60 to F68 for sending packets of the flow i up to its quota Q_i.

More precisely, a test F60 verifies whether the deficit counter DC_i is strictly positive and whether the non-priority queue Queue_i is not empty.

If so, the result of the test F60 is positive. The test is then followed by a step F61 during which the size of the packet at the head of the queue Queue_i is stored in a variable s.

This step F62 is followed by a test F62 which verifies whether this size s is less than or equal to the deficit counter DC_i for this flow.

If so, the result of the test F62 is positive. The test is then followed by a step F64 during which this packet is sent, after removing it from the queue Queue_i using the function RemoveFromQueue( ).

The sending step F64 is followed by a step F66 during which the size s of this packet is subtracted from the deficit counter DC_i.

This subtraction step F66 is followed by the above-mentioned test F60 which verifies whether the Queue_i associated with the flow i is not empty and whether the deficit counter DC_i for that queue is strictly positive.

If all the packets of the flow i, up to the authorized quota DC_i, have been sent, then the result of the test F60 or the test F62 is negative.

During a step F70, the flow i is then removed from the list ActiveList of active flows using the above-mentioned operator RemoveActiveList.

This removal step F70 is followed by a test F80 which verifies whether the queue Queue_i associated with the flow i is empty.

If so, the deficit counter DC_i associated with the flow i is initialized to 0 during an initialization step F82.

If not, the flow i is inserted at the end of the list ActiveList of active flows during an insertion step F84 using the function InsertActiveList.

The steps F82 of initializing the deficit counter DC_i and F84 of inserting the flow i into the list ActiveList of active flows are followed by the above-described test F10.

The person skilled in the art knows that, in practice, the list ActiveList of active flows must be sized for a low probability of overflow.

In one particular embodiment, when a packet of a new flow is received and the list ActiveList of active flows is full, that packet is placed in the priority queue PQ, but the flow to which it belongs is not added to the list ActiveList of active flows.

This packet is then sent (step F24), but the information associated with the flow to which it belongs is not updated.

Accordingly, the packets to which the exception processing is applied have priority even if the bit rate of their flow exceeds the current fair bit rate.

This violation is not a problem, given that there is a very low probability of remaining in this state as and when packets arrive for a flow with a bit rate greater than the fair bit rate.

Note that the ordonnancing algorithm according to the invention, based on the known DRR method, is of O(1) complexity.

FIGS. 3A to 3F show an example of the working of the ordonnancing method according to the invention described above with reference to FIGS. 1 and 2.

The description assumes that three queues Queue_1, Queue_2, Queue_3 contain packets E of respective flows flow 1, flow 2, flow 3. The sizes of these packets are indicated in these figures.

It is also assumed that the priority queue PQ is empty at the start of this scenario.

Finally, the value of the quota Q_i allocated to each flow i is assumed to be equal to 1500.

In these figures, the black arrow indicates the head of the list of flows active in the cycle, this cycle following the following order of the non-priority queues: Queue_1, Queue_2, Queue_3, Queue_4.

The packet being serviced in each of the various steps is shown shaded.

Figure 3A:
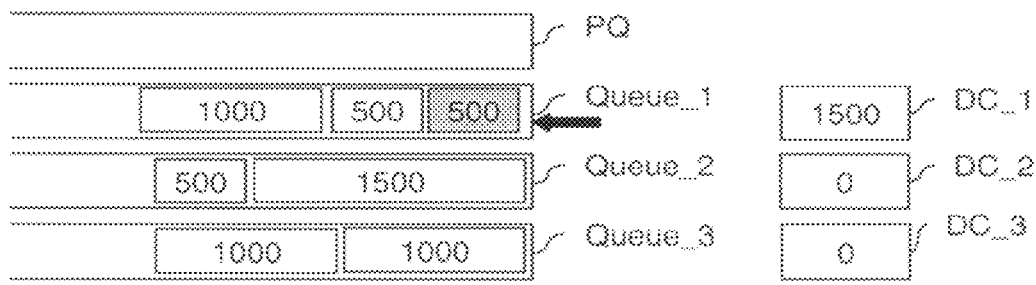
FIGS. 3A to 3F show an example of the working of the ordonnancing method of FIGS. 1 and 2.

Initially, as shown in FIG. 3A, the flow that is at the head of the list is the flow 1 associated with the queue Queue_1.

Its deficit counter DC_1 is increased by its quota Q_1, namely 1500.

The router 100 can therefore begin to service the first packet (shaded) of this queue Queue_1, the size of this packet here being 500 bytes.

Figure 3B:
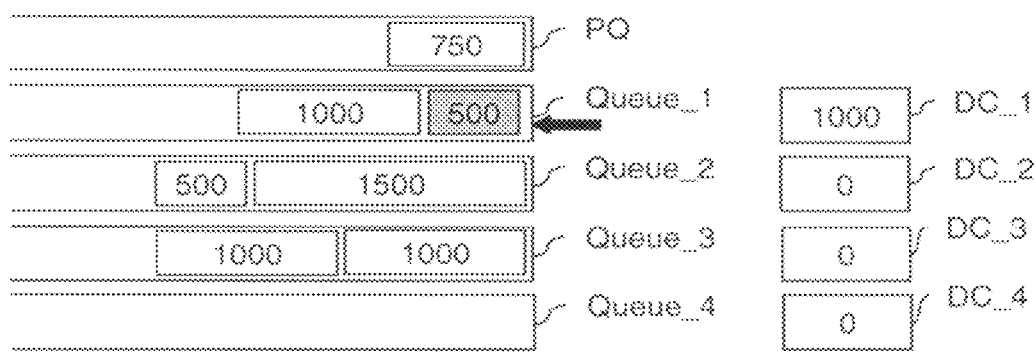

FIG. 3B assumes that a packet belonging to a new flow 4 arrives during the servicing of the preceding packet.

A queue Queue_4 is created and associated with this flow 4.

In contrast to what would happen in the context of conventional DRR type ordonnancing, here this packet is inserted in the priority queue PQ as described above with reference to the step E48.

However, the processing of the flow 1 continues, the size of the second packet of Queue_1, which is 500 bytes, being less than the new deficit DC_1 (results of tests F60 and F62 both positive).

Figure 3C:
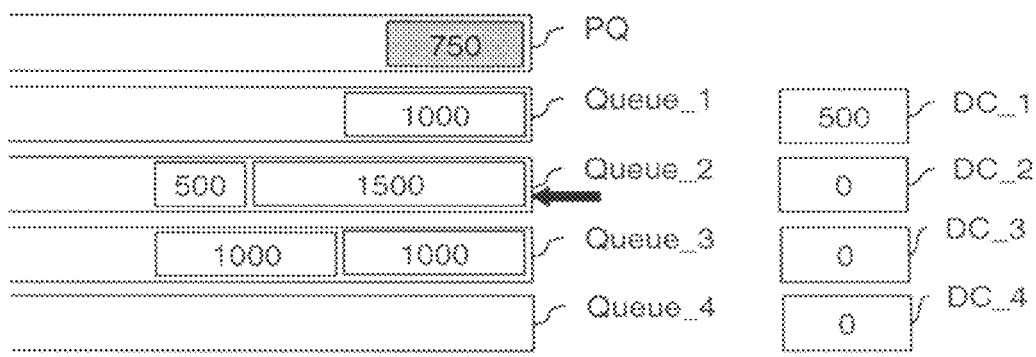

In the step shown in FIG. 3C, the processing of the flow 1 has been completed as the deficit DC_1 associated with the queue Queue_1 is equal to 500, that deficit being less than the size 1000 of the next packet (result of test F62 negative).

In accordance with the invention, and in contrast to what would happen in the context of conventional DRR type ordonnancing, the priority queue PQ containing the packet belonging to the flow 4 whose deficit DC 4 is decremented (see step F66) is serviced (result of test F10 negative).

Figure 3D:
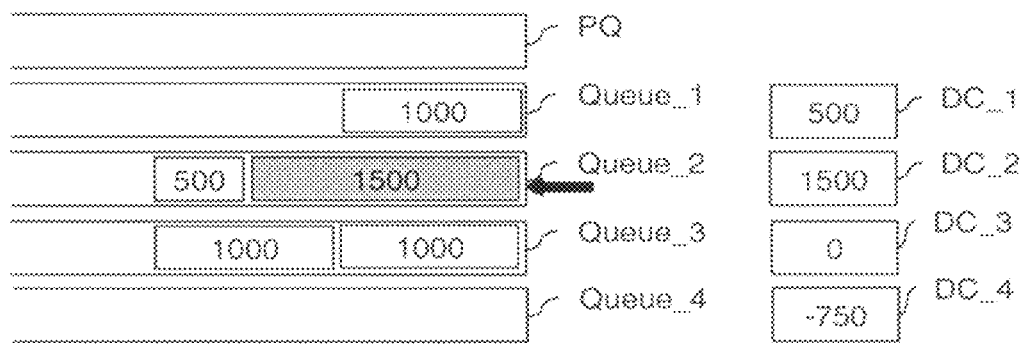

During the next step shown in FIG. 3D, the priority queue PQ now being empty (result of test F10 positive), the first active real flow is processed (result of test F30 positive), namely the flow 2 associated with the queue Queue_2.

Figure 3E:
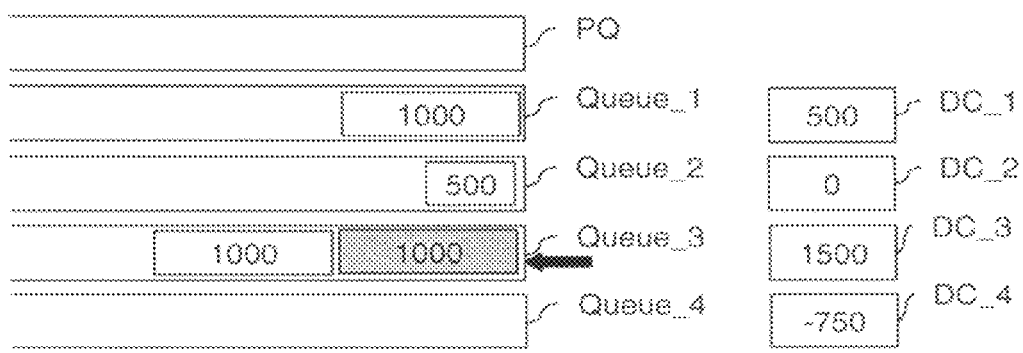

During the next step represented in FIG. 3E, the next flow (flow 3) is processed because the size of the remaining packet in the queue Queue_2 is greater than the quota DC_2 associated with that queue (result of test F62 negative).

Figure 3F:
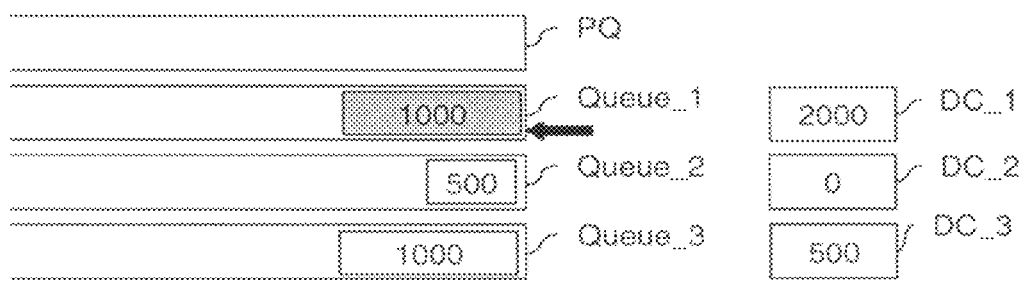

The final step shown in FIG. 3F constitutes the beginning of a new cycle in which servicing the flow 1 resumes. The flow 4 is no longer active because its queue Queue_4 is empty, and so it is not part of ActiveList.

Figure 4:
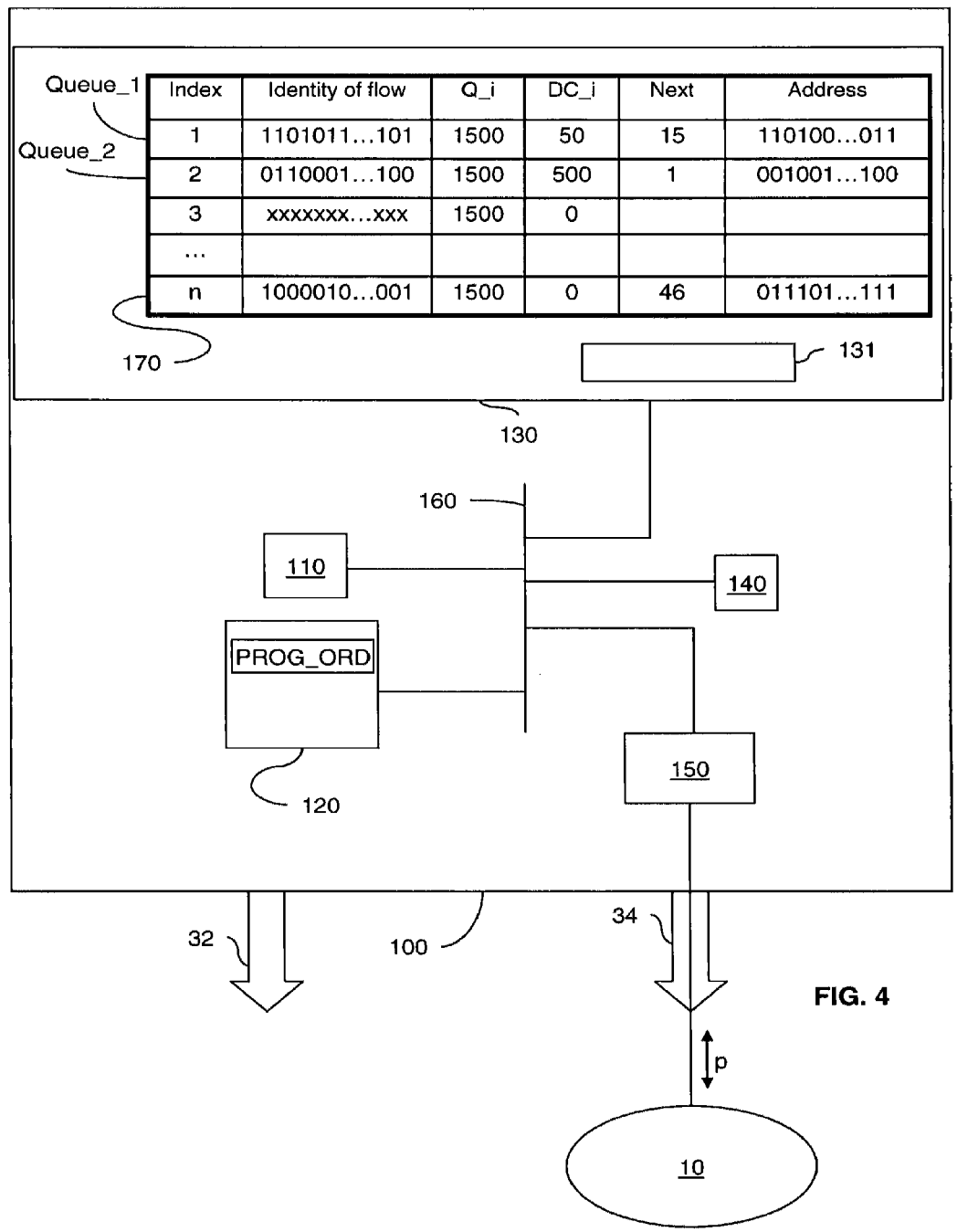
FIG. 4 shows an ordonnancing device in accordance with one particular embodiment of the invention.

FIG. 4 shows one particular embodiment of an ordonnancing device 100 according to the invention. This ordonnancing device may typically be implemented in a router or in a processor or microprocessor for use in a router.

In a conventional way, this device receives packets p that it either ordonnances with a view to sending them or rejects in the event of an overflow.

In this FIG. 4, the reference 34 designates the departure of the packets (steps F24, F64) and the reference 32 designates the rejection of the packets (step E20).

This ordonnancing device 100 includes a processor 110, a read-only memory 120, a random-access memory 130, and a clock 140.

The ordonnancing device 100 also includes hardware and software communications means 150 consisting for example of a network card connected to the Internet network 10 and software layers adapted to implement the TCP/IP communications protocol.

These communications means 150 are in particular adapted to receive a packet p and to store it in an area 131 of the random-access memory 130 and to read a packet E from that area in order to send it over the Internet network 10.

The various hardware units of the ordonnancing device 100 are interconnected by a bus system 160. This is known in the art.

According to the invention, the read-only memory 120 contains the ordonnancing program PROG_ORD and the random-access memory 130 contains a data structure 170 for executing this ordonnancing program PROG_ORD.

This data structure 170 is represented in the form of a table wherein each row corresponds to a queue Queue_i associated with a flow i. More precisely, in this table:
the first column stores the index i of the flow;
the second column stores the identifier of the flow i;
the third column stores the quota Q_i of the queue Queue_i;
the fourth column stores the deficit counter DC_i of the queue Queue_i;
the fifth column is used to manage the cycle of the flows from the list ActiveList of active flows by storing the index of the queue following the queue Queue_i in that list (as is known in the art, managing these pointers enables flows to be inserted and extracted from the list ActiveList of active flows); and
the last column gives the storage address of the packet at the head of the queue Queue_i in the random-access memory 130 (as is known in the art, subsequent packets in the queue Queue_i are accessible by means of a list of chained pointers).

In one particular embodiment, the activity of a flow is verified by comparing the identifier of a flow to the content of the second column of the data structure 1709, for example using a content-addressable memory (CAM).

Figure 5:
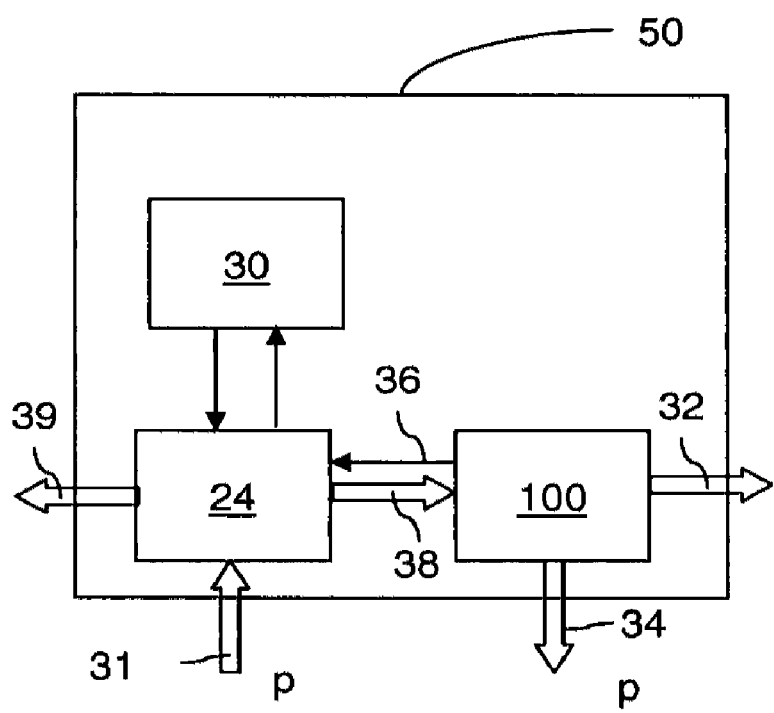
FIG. 5 shows a packet processing device in accordance with one particular embodiment of the invention.

A router 50 in accordance with one particular embodiment of the invention is described below with reference to FIG. 5.

This router 50 includes an ordonnancing device 100 identical or similar to that described above with reference to FIG. 4. In the particular embodiment described here, this router further includes a module 24 for controlling the admission of each packet p of the incoming flows (solid arrow 31).

For example, the packets p presented to this module are determined by standard routing functions that may include load sharing obtained by applying a hashing function to a subset of fields of the flow identifier.

In the embodiment described here, this admission control module 24 effects two levels of control that can be implemented independently.

To this end, the admission control module 24 consults and updates a list 30 of "protected" flows, that is to say flows admitted by the admission control module 24 that are active (i.e. where a packet of this flow has been identified for a predetermined time interval), and the size of the packets of a given flow must be directly routed or not, depending on this list 30 of protected flows, that is to say without it being necessary to verify the admission conditions for routing the packet to the ordonnancing device.

In concrete terms, this list 30 of protected flows is a list of identifiers of flows indicating the time of arrival of the last packet of each flow.

In one particular embodiment, to limit the capacities of each list and thereby to guarantee expandability, each list is associated with a partition of the identifier space.

In that embodiment, the flow is deleted from the list 30 of identifiers if the time elapsed since the last packet of that flow was received exceeds a threshold or a time-out. The length of this time-out, which is for example of the order of a few seconds, is a system parameter.

In one particular embodiment, this list 30 is sized to limit the probability of saturation, a situation in which this flow should be placed in the list but the list is already full.

The consequence of such saturation would be that a flow would be delayed in acquiring the protected flow status. The packets would nevertheless be routed correctly if the congestion state allows it. As is known in the art, the probability of saturation may be made sufficiently low by adequate sizing.

If the packet belongs to a protected flow, it is routed directly (arrow 38) to the ordonnancing device 100 corresponding to the correct output interface, the time of arrival of the last packet of this protected flow being updated in the list 30 of identifiers.

If the flow is not protected already, a routing decision must be taken, on the basis of admission conditions received from the ordonnancing module.

In accordance with the invention, another function determines the admission conditions on the basis of congestion measurements effected by the ordonnancing device 100. The provision of those conditions is indicated by the arrow 36 in FIG. 5.

In one particular embodiment, two congestion estimators are used, the fair bit rate DE and the priority load CP:
 the fair bit rate is a measure of the bit rate that would be produced by a data flow that would always have packets to send; and
 the priority load is the sum of the length of the priority packets transmitted in a certain period divided by the duration of that period.

A continuous count of the load state of the controlled link is obtained by effecting periodic measurements. There are typically different measurement periods for the fair bit rate (for example of the order of 100 milliseconds) and the priority load (for example of the order of 10 milliseconds).

In the particular embodiment of the invention described here, the congestion estimators CP and DE are calculated by a measurement process separate from the ordonnancing process described above and based on congestion counters PB and FB that are regularly updated by the ordonnancing process in steps F28 and F42.

Moreover, the measurement process (or another module) includes means, not described here, adapted to measure the total time Silence-Time for which the logical variable Silence is equal to the Boolean value TRUE, bearing in mind that this variable Silence is set to the value TRUE in the step F32 and to the value FALSE in the step E50.

By sampling the congestion counter PB at regular intervals, the measurement process deduces an estimate of the priority load as the difference between the values of PB measured at the start and at the end of the measurement period divided by the duration of that period.

A priority load estimator CP for this interval is then given by the equation:

$$CP(T1,T2)=(PB(T2)-PB(T1))\times 8/(T2-T1)/C$$

in which:
 PB(T) is the value in bytes of PB at the time T;
 (T1, T2) is a measurement period (in seconds); and
 C is the link bit rate (in bps).

In accordance with the invention, to estimate the fair bit rate DE, it is assumed that the dummy flow 0 sends continuously packets of fixed size equal to Q_0 (the quota associated with the dummy flow 0).

In a period in which the priority Q is constantly occupied, the number of bytes that the dummy flow 0 could have sent is deduced from the changing state of the congestion counter FB. When the queue is empty, the dummy flow 0 could have sent at the bit rate C of the link.

By conjugating the succession of active periods and periods of silence, an estimate of the fair bit rate DE is deduced from the following equation:

$$DE(T1,T2)=\max(\text{Silence\_Time}\times C/(T2-T1),(FB(T2)-FB(T1))\times 8/(T2-T1))$$

where:
 FB(T) is the value in bytes of FB at the time T;
 (T1, T2) is a measurement period; and
 Silence_Time is the total duration of silence during the interval (T1, T2).

The person skilled in the art will readily understand that in calculating the fair bit rate DE the first term prevails if the load of the link is low (as the dummy flow 0 would have used all the capacity of the link remaining available) and the second term prevails in periods of activity, this term approximately measuring the bit rate that would be achieved by a real flow that always had at least one packet in the queue associated with it.

The ordonnancing module 100 then determines an admission condition from the congestion estimators CP (priority load) and DE (fair bit rate). In practice, this determination may be effected using a function Admit(CP, DE) whose result is equal to 1 (respectively 0) if the packets p of new flows not yet having the protected flow status must be routed (respectively rejected), the result of this admission function being supplied by the ordonnancing module 100 to the router module 24 (arrow 36).

If the admission conditions are favorable, the new flow whose packet is routed is inserted into the list of protected flows and thus acquires the protected flow status.

In this figure, the solid arrow 39 represents the rejection of the first packets of the new flows by the router module 24.

In this figure, the solid arrow 38 represents the routing of the packets of the protected flows to the ordonnancing module 100.

The conditions applied may depend on particular attributes of the packet including the value of the "traffic class" field in IPv6 or the field ToS in IPv4 or the IP source and destination addresses.

Admission control ensures the transparency of the flows admitted: conservation of the signal for the real time flows, conservation of the bit rate for the data flows.

In fact, this transparency is offered only to flows whose peak bit rate (determined by external limitations) remains below a certain threshold.

For details of choosing admission thresholds relative to the fair bit rate and the priority load enabling admission control to be implemented to ensure the transparency of the flows, the person skilled in the art may refer to the above-mentioned document FR2854296 in the name of the Applicant.

In the above description, the measurement process and the ordonnancing process are separate from each other. The measurement process may instead be integrated into the ordonnancing process.

The invention claimed is:

1. A method of scheduling packets (p) belonging to different flows (i) upon reception of a packet at a scheduling device, a non priority queue (Queue_i) being associated with each flow, the method comprising:
 determining, at a processor of the scheduling device, a priority of said received packet, a priority packet being:
  a first packet of a flow not present in a list of active flows, an index of said active flows being inserted at an end of said list of active flows; and
  packets of said flow received in a cycle, as long as a volume (BytesCount_i) of received packets of said flow is less than a quota (Q_i) associated with said cycle;
 queuing said received packet in the non priority queue (Queue_i) associated with the flow of said received packet (p) if said packet is determined as having non priority; and
 queuing said received packet (p) in a single priority queue (PQ) for all received packets if said packet is determined as having priority;
 wherein non priority queues (Queue_i) respectively associated with the flows of said list of active flows are processed cyclically according to their rank in said list of active flows, said single priority queue (PQ) for all received packets being processed in priority in comparison to each said non priority queue (Queue_i) in said cycle;
 wherein processing of a single non priority queue (Queue_i) comprises sending the packets contained in said non priority queue (Queue_i) until said quota (Q_i) associated with said flow is reached and removing the index associated with the non priority queue (Queue_i) from said list of active flows if the non priority queue (Queue_i) is empty subsequent to said processing, or moving the index of said flow at the end of said list of active flows if the non priority queue (Queue_i) is not empty subsequent to said processing; and wherein the processing of said priority queue (PQ) for all received packets comprises sending all packets contained in said single priority queue.

2. The scheduling method according to claim 1, further comprising:

measuring a congestion counter which memorizes a volume (PB) of priority packets sent from the single priority queue (PQ) for all received packets, the congestion counter calculating a congestion estimate which is used for admission control.

3. An admission control method using a congestion estimator comprising:

a priority load value (CP) corresponding to a volume (PB) of said priority packets transmitted during a period of time divided by a duration of that period for the admission control, said volume being obtained by the scheduling method of claim 2.

4. The scheduling method according to claim 1, wherein the inactive flows comprise the flow for which no packet has been received in the current cycle.

5. A device for scheduling packets (p) belonging to different flows (i) upon receipt of a packet, a non priority queue (Queue_i) being associated with each flow, the device comprising:

means for determining a priority of said received packet (p), a priority packet being:
a first packet of a flow not present in a list of active flows, an index of said flow being inserted at an end of said list of active flows; and
packets of said flow received in a cycle, as long as a volume (BytesCount_i) of received packets of said flow is less than a quota (Q_i) associated to said flow for said cycle;

means for queuing said received packet in the non priority queue (Queue_i) associated with the flow of said received packet (p) if said packet is determined as having non priority;

means for queuing said received packet (p) in a single priority queue for all received packets if said packet is determined as having priority; and means for processing cyclically said non priority queues respectively associated with the flows of said list of active flows according to their rank in said list of active flows, said single priority queue (PQ) for all received packets being processed in priority in comparison to each said non priority queue (Queue_i) in said cycle, said processing means comprising:
means for sending all packets contained in said single priority queue for all received packets; and
means for sending the packets contained in a non priority queue (Queue_i) until said quota (Q_i) associated with said flow is reached, each means for sending packets being configured to:
remove the index associated with the non priority queue (Queue_i) from said list of active flows if the non priority queue (Queue_i) is empty subsequent to said processing or move the index of said flow at the end of said list of active flows if the non priority queue (Queue_i) is not empty subsequent to said processing.

6. The scheduling device according to claim 5, further comprising:

means for measuring a congestion counter which memorizes a volume of priority packets sent from the single priority queue (PQ) for all received packets, the congestion counter calculating a congestion estimator which is used for admission control.

7. A packet router including the scheduling device according to claim 6 and further including a module for controlling admission using a congestion estimator which is a priority load value (CP) corresponding to a volume (PB) of priority packets transmitted during a period of time divided by a duration of that period, said volume (PB) being obtained by said means for measuring the congestion counter of said scheduling device.

8. The packet router according to claim 7, wherein said admission module for controlling admission is further configured to route directly the packets belonging to protected flows.

9. The scheduling method according to claim 8, wherein said protected flow comprises flows for which at least one packet has been received by said admission module in a predetermined time interval.

10. The device of claim 5, wherein the inactive flows comprise the flow for which no packet has been received in the current cycle.

11. A non-transitory computer readable information medium encoded with a computer program executed by a computer that causes scheduling of packets belonging to different flows (i) upon receipt of a packet at a scheduling device, a non priority queue (Queue_i) being associated with each flow, the computer program comprising:

program code for determining, at a processor of the scheduling device, a priority of said received packet, a priority packet being:
a first packet of a flow not present in a list of active flows, an index of said active flows being inserted at an end of said list of active flows; and
packets of said flow received in a cycle, as long as a volume (BytesCount_i) of received packets of said flow is less than a quota (Q_i) associated with said cycle;

program code for queuing said received packet in the non priority queue (Queue_i) associated with the flow of said received packet (p) if said packet is determined as having non priority; and program code for queuing said received packet (p) in a single priority queue (PQ) for all received packets if said packet is determined as having priority;

wherein non priority queues (Queue_i) respectively associated with the flows of said list of active flows are processed cyclically according to their rank in said list of active flows, said single priority queue (PQ) for all received packets being processed in priority in comparison to said non priority queue (Queue_i) in said cycle;

wherein processing of a single non priority queue (Queue_i) comprises sending the packets contained in said non priority queue (Queue_i) until said quota (Q_i) associated with said flow is reached and removing the index associated with the non priority queue (Queue_i) from said list of active flows if the non priority queue (Queue_i) is empty subsequent to said processing, or moving the index of said flow at the end of said list of active flows if the non priority queue (Queue_i) is not empty subsequent to said processing; and wherein the processing of said single priority queue (PQ) for all received packets comprises sending all packets contained in said single priority queue.

* * * * *